April 28, 1964 B. A. PROCTOR 3,130,975

RECORDING MACHINE

Filed June 15, 1959 3 Sheets-Sheet 1

INVENTOR
BARTON A. PROCTOR
BY
Moses, Nolte, & Nolte
ATTORNEYS

April 28, 1964 B. A. PROCTOR 3,130,975

RECORDING MACHINE

Filed June 15, 1959 3 Sheets-Sheet 2

INVENTOR
BARTON A. PROCTOR
BY
Moses, Nolte, & Nolte
ATTORNEYS

INVENTOR
BARTON A. PROCTOR
BY
Moses, Nolte & Nolte
ATTORNEYS

United States Patent Office 3,130,975

Patented Apr. 28, 1964

3,130,975

RECORDING MACHINE

Barton A. Proctor, 42 Hillside Road, Larchmont, N.Y., assignor of thirty-three and one-third percent to Albert C. Nolte, New York, N.Y.

Filed June 15, 1959, Ser. No. 820,455

16 Claims. (Cl. 274—11)

This invention relates in general to recording and reproducing machines and in particular to a new and useful tape transport mechanism including improved driving means for the constant velocity winding of the recording medium.

The present invention is particularly concerned with a small size portable tape recording machine which operates with the use of a magazine having two reels with a recording medium such as tape which is fed from one reel to the other during the recording and winding operations. The magazine for the tape is provided with a door at one end which may be opened to expose the tape so that this end may be positioned against a set of magnetic heads which are located within the tape unit. A feature of this construction is that reels of the tapes are exposed through an opening for driving the tape directly on its reel through a central capstan and a pair of idler discs which may be positioned in contact with either the tape on one reel or the other for constant speed driving of the tape. The invention is an improvement over other apparatus of this character, particularly in respect to the driving mechanism which permits constant speed winding in either direction in a very small sized magazine-type recording unit.

Accordingly, it is an object of this invention to provide an improved tape transport mechanism.

A further object of this invention is to provide a tape transport mechanism including a central capstan drive which may be selectively positioned to rotate one of two cooperating idler rollers which rollers may be moved into driving engagement with the tape on either of two reels in the magazine.

A further object of this invention is to provide a tape recorder magazine construction including an opening for positioning the tape in alignment with a magnetic recording head at one side and an opening at the opposite side of the magzine to accommodate driving mechanism for rotating a selective one of each of the reels in the magazine.

A further object of this invention is to provide a tape transport mechanism which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
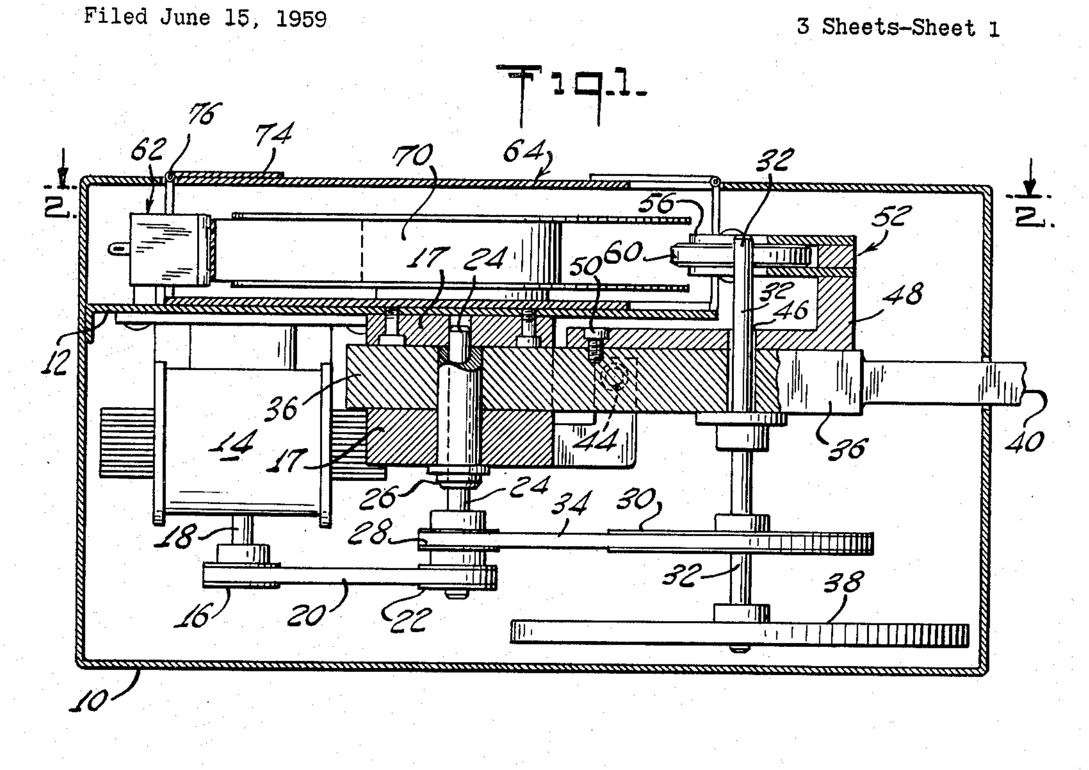
FIG. 1 is a transverse section of a tape recording and reproducing unit constructed in accordance with the invention and taken on line 1—1 of FIG. 2.

Referring to the drawings in particular, the invention as embodied therein includes a substantially block-shaped housing generally designated 10 having an interior horizontal dividing partition 12 which supports the operating mechanism. A driving motor 14 is suspended from the partition 12 and includes a pulley 16 attached to its main output shaft 18 and which is connected by a belt 20 to rotate a pulley 22 affixed to a shaft 24. The shaft 24 is supported for rotation within a hollow sleeve member 26 held in a U-shaped casting 17.

Affixed to the shaft 24 for rotation therwith is a pulley 28 which drives a pulley 30 on a capstan shaft 32 by means of a belt 34.

The capstan shaft 32 is rotatably supported in a vertical position by a sleeve member (not shown) located within a block member generally designated 36. Affixed to the lower end of the shaft 32 is a large flywheel 38 for insuring that the rotational speed of the shaft 32 is uniform.

In accordance with the invention the block member 36 is pivoted on the sleeve member 26 and it may be swung by means of a handle 40 which extends outwardly from the exterior of the housing 10 between two lateral extreme positions. Coil springs 42 and 44 extend laterally outwardly from each side of the block member 36 to permit the springs to be swung against an abutment member (not shown) and to bias the block-shaped member in a direction outwardly therefrom into a neutral position.

The driving capstan shaft 32 extends vertically upwardly through a laterally elongated slot 46 of an L-shaped member 48. The L-shaped member 48 is pivoted as at 50 to the block member 36 and is provided with an idler pulley mounting bracket generally designated 52 which is secured to the upper end face of a vertical leg thereof. The idler pulley mounting bracket 52 is provided with two outwardly extending arms 54 and 56 which are approximately 120 degrees apart and are positioned on each side of the upper end of the driving capstan 32. Driving discs 58 and 60 are rotatably mounted at each end of the arms 54 and 56, respectively.

The driving discs 58 and 60 extend above the partition wall 12 and are in horizontal alignment with but laterally spaced from magnetic recording heads generally designated 62. The space between the magnetic recording heads 62 and the driving discs 58 and 60 is great enough to accommodate a reel and tape magazine generally designated 64. The magazine 64 is generally flat box-shaped and is provided with an opening 66 to accommodate one or the other of the driving discs 58 and 60 which may be selectively positioned in driving contact with magnetic tape 68 which extends between a pair of tape reels 70 and 72 which are rotatably mounted within the magazine 64. The opposite end of the magazine is provided with a door 74 which is connected by hinges 76 to the body of the magazine so that it may be swung open to permit pressing of the tape against the magnetic heads 62 when the magazine is inserted within the housing 10. When the magazine is positioned within the housing the door 74 is swung against the top face of the magazine container. The opposite side of the magazine is aligned in the position indicated in FIG. 2.

In accordance with the invention when it is desired to drive either the reel 70 or the reel 72 it is merely necessary to move the handle 40 toward this reel in order to first bring the driving disc 60 into contact with the tape on the reel 70. Continued movement of the handle 40 in this direction effects pivoting of the L-shaped member 48 until the driving capstan 32 is brought adjacent the driving disc 60 to cause rotation thereof and driving of the tape through the disc by actual contact therewith. In FIG. 1 the driving disc 60 is indicated in a tape driving position. Suitable means (not shown) are provided to maintain the driving capstan 32 in driving contact with the disc 60 and the disc in driving contact with the tape 68. Since the tape 68 is being constantly wound onto the reel 70 by the driving capstan 32, the point of contact between the disc 60 and the tape shifts along a radial line gradually outwardly in a direction from the center of the reel 70 to the outer edge thereof. Suitable means (not shown) are provided to permit this radial shifting of the capstan and the associated driving disc.

Figure 3:
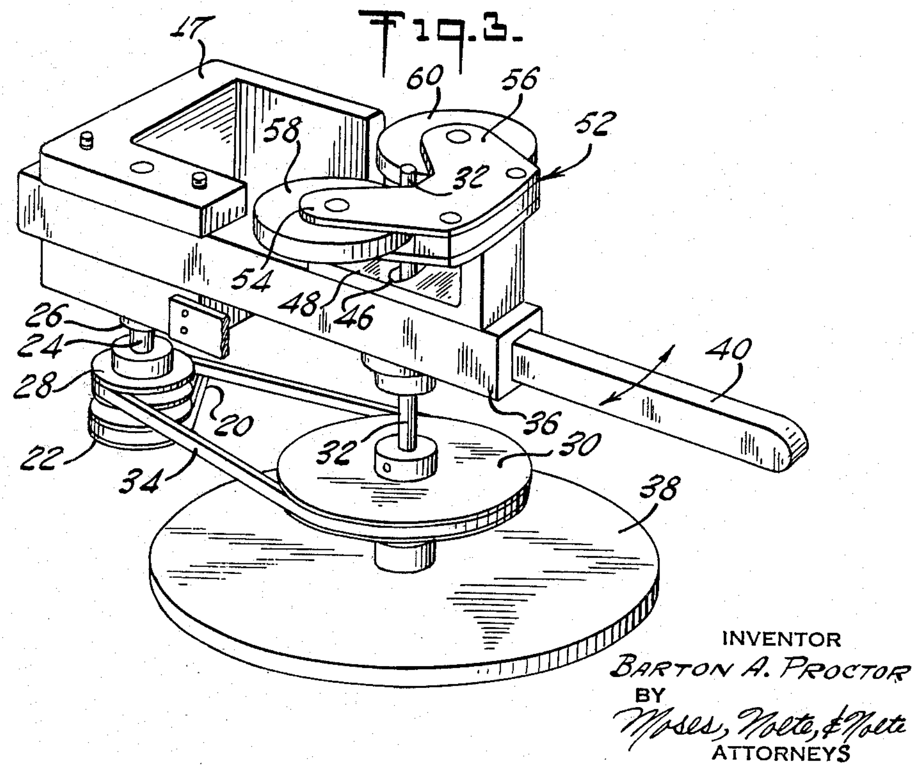
FIG. 3 is a perspective view of the tape driving mechanism.
Figure 2:
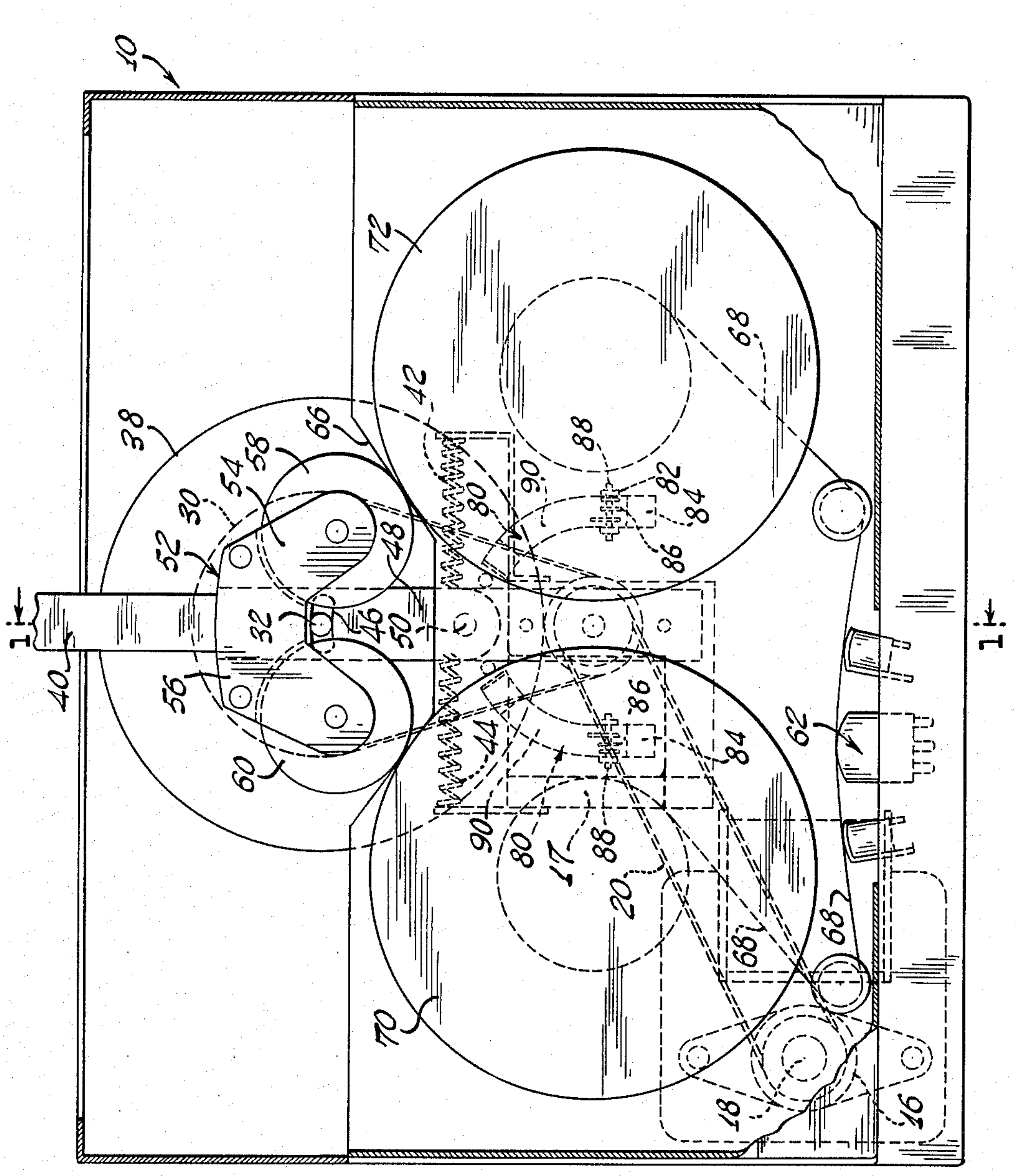
FIG. 2 is a horizontal section taken on the line 2—2 of FIG. 1.
Figure 4:
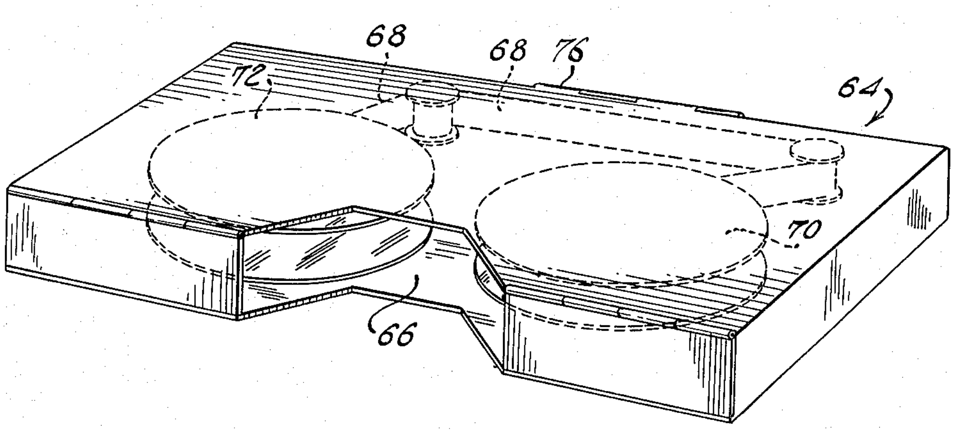
FIG. 4 is a perspective view of a magazine for use with the tape recorder.
Figure 5:
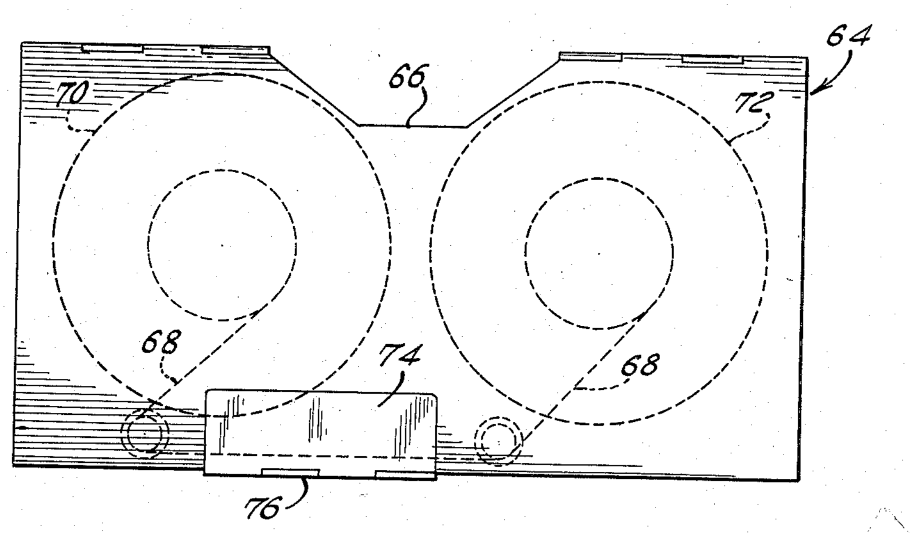
FIG. 5 is a top plan view of the magazine indicated in FIG. 4.

Referring to FIG. 2, the magazine 64 is provided with a brake lever member generally designated 80 which is pivotally mounted on an upstanding bracket 82 on a bottom interior wall of the magazine beneath each reel 70 and 72. Each lever member 80 includes a cushioned brake arm 84 which is biased against the bottom face of its associated reel 70 or 72 by a coil spring 86 wound around a pivot pin 88. The brake lever member 80 includes another arm 90 on the opposite side of the pivot pin 88, which extends above an opening (not shown) in the bottom of the magazine. The block member 36 is provided with a member (not shown) which is biased against the underside of the wall 12 (FIGS. 1 and 3), and which enters the opening of the magazine to raise the arm 90 and move the cushioned end 84 out of contact with its associated reel whenever the capstan is moved to a position to drive the tape onto this reel. Thus, the reel which is being unwound is always braked by the lever member 80, and the brake is disengaged when it is being wound.

Thus, the invention provides a novel magazine-type tape recorder in which the magazine may be easily inserted into the top of the unit which houses the driving and recording mechanism. The magazine is constructed so that one end may be positioned in alignment with the magnetic recording heads and the other end may be positioned to receive a driving member to transport the tape in either direction past the magnetic recording heads. The invention provides a simple means for either winding or unwinding the tape from either of two reels in the magazine by the mere positioning of a driving disc member either 58 or 60 into contact with the tape of the associated reel 70 and 72. The driving mechanism is extremely simple using only one main driving capstan, which may be alternately arranged to drive through one or the other of two driving disc members for winding or unwinding purposes of the tape of the magazine.

While a specific embodiment of the invention has been shown and described in detail to illustrate the application of the invention principles, it will be understood that the invention may be embodied otherwise without departing from such principles.

What is claimed is:

1. In a recording device including a housing having an opening therein, a recording head adjacent one side of said opening, and driving means adjacent the opposite side of said opening, the improvement comprising a magazine, said magazine having at least two reels having tape thereon and extending therebetween, said reels being rotatably mounted in said magazine, a first opening for receiving said recording head in one side of said magazine, said tape being disposed across said first opening, a second opening accommodating at least a portion of said driving means in the side of said magazine opposite said first opening, said reels being exposed in said second opening whereby to afford access for driving mechanism to contact said tape on said reels.

2. In a recording device according to claim 1, including a door arranged in said first opening of said magazine, said door being pivotally mounted whereby it may be swung open to expose said tape for access by said recording head.

3. A recording medium transport mechanism for a tape recorder and the like comprising a first and a second reel, recording medium wound upon said reels and extending therebetween, and a driving mechanism for said recording medium including an upstanding rotating capstan, idler roller means adjacent said capstan, and means for shifting said idler roller means into contact with said recording medium at its location on one of said first and second reels and for thereafter shifting said capstan into direct surface contact with said idler roller means whereby to drive said recording medium by contact therewith.

4. A recording medium transport mechanism according to claim 3, wherein said roller means includes a disc member rotatably mounted on each side of said capstan.

5. A recording medium transport mechanism according to claim 4 including single handle means to shift a predetermined one of said rollers against the recording medium of an adjacent reel and thereafter to shift said capstan into contact with said disc member.

6. A recording medium transport mechanism comprising first and second spaced reel members, a recording medium extending between and being windable upon each of said reels, recording head means between said reels positioned to actuate said recording medium, and recording medium driving means between said reels including an upstanding capstan shaft, means to continuously rotate said capstan shaft, a first idler roller on one side of said capstan shaft adjacent said first reel, a second idler roller on the other side of said capstan shaft adjacent said second reel, said first and second idler rollers and said capstan shaft being shiftable about a pivotal location between said first and second reels, and means to shift a predetermined one of said first and second rollers into contact with the recording medium on a predetermined one of said first and second reels, said means including means to shift said capstan into driving engagement with said predetermined first and second roller whereby to drive said recording medium through said capstan to said predetermined roller and then to said recording medium.

7. A recording medium transport mechanism according to claim 6, wherein said first and second reels are arranged in a magazine unit which is detachable from said recording unit.

8. A recording medium transport mechanism according to claim 7, wherein said magazine has an opening on each side, along one of which said recording medium extends for contact with said recording head and the other being large enough to accommodate one of said first and second rollers.

9. A recording medium transport mechanism comprising a housing having an opening in one wall, recording head means adjacent one end of said opening, driving means adjacent the other end of sad opening and means to accommodate a magazine between said driving means and said recording head means, said driving means including an upstanding capstan member, means to continuously rotate said capstan member, a pivotal L-shaped member, first and second idler pulleys extending outwardly from an upstanding leg of said L-shaped member on each side of said capstan, said L-shaped member having a laterally elongated lateral slot to accommodate said capstan, and handle means to pivot said L-shaped member toward and away from said magazine, a magazine positioned in said housing, said magazine including two spaced reels, recording medium wound on said reels and extending therebetween, said idler rollers being shiftable into contact with the recording medium on an associated one of said first and second reels, and said capstan being shiftable into contact with a respective one of said roller means whereby to drive said recording medium.

10. In a recording device according to claim 1, including a brake lever pivotally mounted below each of said reels, including an arm biased into engagement with an associated reel, and an opening below the other arm of said brake lever adapted to receive an actuator to release said lever from engagement with said reel.

11. A cartridge for a recording medium and the like comprising a housing having a bottom portion, a top portion and a plurality of sides, at least two recording medium reels rotatably mounted in said housing, said housing having an opening between said reels on one side thereof for accommodating means external to said cartridge for driving said recording medium onto a respective one of said reels, and a second opening in a side of said housing said second opening being spaced from said first opening for accommodating a recording head, and means in said housing for guiding said recording medium past said second opening.

12. In a recording device including spaced reel members for winding and unwinding recording medium thereof, a recording head disposed adjacent said reel members, and means for guiding said recording medium past said recording head, the improvement comprising single rotatable driving capstan means, and means for pivotally supporting said driving capstan means for movement into engagement with the recording medium on a respective one of said reels.

13. In a recording device including a housing having an opening therein, a magnetic head adjacent one side of said opening, and driving means adjacent the opposite side of said opening, the improvement comprising a magazine, said magazine having tape wound on reel means, said reel means being rotatably mounted in said magazine, a first opening for receiving said magnetic head in one side of said magazine, said tape being disposed across said first opening, a second opening accommodating at least a portion of said driving means in the side of said magazine opposite said first opening, said reel means being exposed in said second opening to provide access for at least a portion of said driving means to contact said tape on said reel means.

14. A recording medium transport mechanism, comprising a laterally shiftable capstan shaft means for driving a recording medium, and laterally shiftable friction idler wheel means for drivingly engaging on the same circumferential surface thereof said capstan shaft and said recording medium for connecting said capstan shaft to said recording medium.

15. A recording medium transport mechanism, comprising a laterally shiftable capstan, laterally shiftable friction idler wheel means for drivingly engaging said capstan and connecting it to a recording medium on the same perimeter of said friction idler wheel means, and magnetic head means substantially opposite said capstan.

16. A recording medium transport mechanism, comprising two reels for a recording medium, a capstan laterally shiftable between said two reels, friction idler means laterally slidable between said two reels and drivingly connecting said capstan to a recording medium on a preselected one of said two reels, said friction idler means including a friction wheel frictionally engageable on its perimeter simultaneously by said capstan and the recording medium on one of said reels.

References Cited in the file of this patent

UNITED STATES PATENTS

| | | |
|---|---|---|
| 2,457,699 | Marsen | Dec. 28, 1948 |
| 2,712,448 | Schroter | July 5, 1955 |
| 2,719,884 | Reed et al. | Oct. 4, 1955 |
| 2,732,144 | Jones | Jan. 24, 1956 |

FOREIGN PATENTS

| | | |
|---|---|---|
| 1,048,235 | France | Dec. 21, 1953 |
| 712,536 | Great Britain | July 28, 1954 |
| 971,401 | Germany | Jan. 22, 1959 |